US 9,406,941 B2

(12) United States Patent
Mei et al.

(10) Patent No.: US 9,406,941 B2
(45) Date of Patent: Aug. 2, 2016

(54) CATALYST LAYER, MEMBRANE ELECTRODE ASSEMBLY, AND ELECTROCHEMICAL CELL

(75) Inventors: Wu Mei, Kanagawa-ken (JP); Taishi Fukazawa, Tokyo (JP); Yoshihiro Akasaka, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 26 days.

(21) Appl. No.: 13/421,662

(22) Filed: Mar. 15, 2012

(65) Prior Publication Data
US 2012/0251915 A1    Oct. 4, 2012

(30) Foreign Application Priority Data
Mar. 28, 2011    (JP) ................. P2011-069148

(51) Int. Cl.
*H01M 4/86* (2006.01)
*H01M 8/10* (2016.01)

(52) U.S. Cl.
CPC .......... *H01M 4/8626* (2013.01); *H01M 4/8605* (2013.01); *H01M 4/8657* (2013.01); *H01M 8/1004* (2013.01); H01M 2008/1095 (2013.01); Y02E 60/521 (2013.01)

(58) Field of Classification Search
None
See application file for complete search history.

(56) References Cited

U.S. PATENT DOCUMENTS

| 2008/0230171 A1 | 9/2008 | Mei et al. |
| 2010/0021787 A1 | 1/2010 | Wu et al. |
| 2010/0239950 A1 | 9/2010 | Mei et al. |
| 2010/0273093 A1 | 10/2010 | Debe et al. |

FOREIGN PATENT DOCUMENTS

| JP | 2003-208908 | 7/2003 |
| JP | 2008-229514 | 10/2008 |
| JP | 2010-221090 | 10/2010 |

OTHER PUBLICATIONS

Yang et al. (Eur. J. Inorg. Chem. 2006, 4787-4792).*
Qin et al. (J. Power Sources 192 (2009) 385-390).*
Wang et al. (J. Phys. Chem. B 2006, 110, 16930-16936).*
Notification of the First Office Action issued by the State Intellectual Property Office (SIPO) of the People's Republic of China on Feb. 8, 2014, in counterpart Chinese Patent Application No. 201210061885.7.
Notification of the 2$^{nd}$ Office Action issued by the State Intellectual Property Office (SIPO) of the People's Republic of China on Aug. 18, 2014, in counterpart Chinese Patent Application No. 201210061885.7.
Notice of Reasons for Rejection issued by the Japanese Patent Office on Jul. 18, 2014, in counterpart Japanese Patent Application No. 2011-069148.

(Continued)

*Primary Examiner* — Carlos Barcena
*Assistant Examiner* — Wojciech Haske
(74) *Attorney, Agent, or Firm* — Finnegan, Henderson, Farabow, Garrett & Dunner LLP (57) ABSTRACT

A catalyst layer includes a layered structure. The layered structure is laminated with sheet-like unit catalysts and pore layers. The sheet-like unit catalysts have mean thicknesses of 4 to 30 nm. The pore layers are sandwiched between the sheet-like unit catalysts.

22 Claims, 6 Drawing Sheets

(56) References Cited

OTHER PUBLICATIONS

Notification of the 3$^{rd}$ Office Action issued by the State Intellectual Property Office of the People's Republic of China on Feb. 11, 2015, for Chinese Patent Application No. 201210061885.7, and English-language translation thereof.

Notice of Reasons for Refusal issued by the Japanese Patent Office on Oct. 30, 2015, in counterpart Japanese Patent Application No. 2014-260515.

\* cited by examiner

14
CATALYST LAYER, MEMBRANE ELECTRODE ASSEMBLY, AND ELECTROCHEMICAL CELL

CROSS REFERENCE TO RELATED APPLICATION

This application is based upon and claims the benefit of priority from the prior Japanese Patent Application No. 2011-069148, filed on Mar. 28, 2011, the entire contents of which are incorporated herein by reference.

FIELD

Embodiments relate basically to a catalyst layer, a membrane electrode assembly and an electrochemical cell.

BACKGROUND

Electrochemical cells, such as polymer electrolyte electrochemical cells, have been extensively studied in fields of a fuel cell, water electrolysis, and the like.

Among these electrochemical cells, e.g., a fuel cell is a system in which a fuel such as hydrogen is electrochemically reacted with an oxidant such as oxygen to generate electric power. Among them, a polymer electrolyte fuel cell (PEFC) can operate at low temperatures as compared with other fuel cells and its reaction product is water, thereby lowering an environmental load. Hence this cell has been developed and supplied to practical use as a household stationary power source, and further as an automotive power source. Such a polymer electrolyte fuel cell is provided with a membrane electrode assembly (MEA) basically including a polyelectrolyte membrane having proton conductivity and two electrodes, i.e., a fuel electrode (anode) to be supplied with hydrogen and an air electrode (cathode) to be supplied with air, which sandwich in the membrane therebetween.

For a catalyst layer of each electrode used in the polymer electrolyte fuel cell, a carbon-supported catalyst is typically employed to control pores in the catalyst layer and to suppress catalyst agglomeration.

A slurry method, a sputtering method, or a vapor deposition method has been studied to provide the catalyst layer.

BRIEF DESCRIPTION OF THE DRAWINGS

Aspects of this disclosure will become apparent upon reading the following detailed description and upon reference to the accompanying drawings.

DESCRIPTION

A catalyst layer of an embodiment includes a layered structure. The layered structure includes a laminated structure. The laminated structure includes sheet-like unit catalysts and pore layers. The sheet-like unit catalysts have mean thicknesses of 4 to 30 nm. The pore layers are sandwiched between the sheet-like unit catalysts.

A catalyst layer of another embodiment includes a laminated structure of sheet-like unit catalysts being laminated in a thickness direction of the sheet-like unit catalysts.

A membrane electrode assembly of another embodiment includes the catalyst layer.

An electrochemical cell of another embodiment includes the membrane electrode assembly.

Hereinafter, embodiments will be described with reference to drawings.

First Embodiment

When employing an electrochemical cell such as a polymer electrolyte fuel cell (PEFC) for a vehicle, a carbon carrier of a carbon-supported catalyst used in a catalyst layer is heavily corroded as a result of starting and stopping of the vehicle, thereby leading to accelerated deterioration in the catalyst layer and further in a membrane electrode assembly. Thus it has been required to improve the catalyst layer so as to improve durability, in particular cycle durability.

For the improvement in a catalyst layer, a catalyst layer formed by sputtering or vapor deposition and an electrode formed using the catalyst have been studied, thereby enabling higher durability than that of the catalyst layer using the conventional carbon-supported catalyst. For example, as a forming method of the catalyst layer by sputtering, forming a carbonless catalyst layer by sputtering a Pt catalyst material onto a whisker substrate has been studied. The method is advantageous for high durability and low usage of a catalyst. However, a lump of the platinum catalyst reaches a size of several tens of nm, thus requiring improvement in usage efficiency of the catalyst material.

Further, forming pores inside the catalyst layer has been studied. The pores are formed by forming a catalyst layer with use of a catalyst material mixed with a pore-forming material and subsequently removing the pore-forming material by dissolving. In recent years, a laminated structure has been studied. The laminated structure includes catalyst aggregation layers and pore layers. The laminated structure is formed by sequentially depositing a mixed layer and a pore-forming material layer by sputtering. The mixed layer includes the catalyst material and the pore-forming material. The laminated structure is formed by removing the pore-forming material inside the obtained mixed layer and the pore-forming material layer by dissolving, thereby enabling high catalyst usage efficiency. However, durability and the like are not sufficient yet. Further improvement in the durability is required.

In order to improve the usage efficiency and durability of a catalyst material of a catalyst layer in an electrode of a MEA (Membrane Electrode Assembly) of an electrochemical cell, the inventors were dedicated to such studies and reached the following finding for controlling a fine structure of the catalyst layer.

In accordance with the embodiment, a catalyst layer includes a laminated structure in which sheet-like unit catalysts having mean thicknesses of 4 to 30 nm are laminated, and pore layers are respectively provided between the sheet-like unit catalysts.

It is to be noted that the sheet-like unit catalysts and the pore layers are collectively referred to as a catalyst layer in the embodiment. The sheet-like unit catalysts are included in the entire electrodes of MEA of the electrochemical cell.

The catalyst layer having the laminated structure in the embodiment enables improvement in durability and usage efficiency of the catalyst material in the electrode of the MEA of the electrochemical cell, particularly in cycle durability.

Hereinafter, the embodiment will be described in detail.

Figure 1:
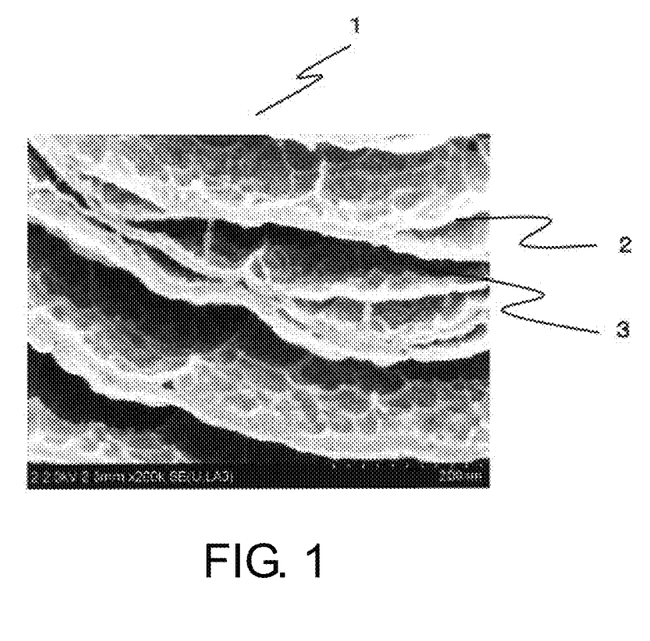
FIG. 1 is an SEM image showing a catalyst layer of a first embodiment.

FIG. 1 is an SEM image showing a catalyst layer of the embodiment.

The SEM image of FIG. 1 shows a portion of a cross section of a catalyst layer 1 with use of a scanning electron microscope (SEM). The catalyst layer 1 has a laminated structure including sheet-like unit catalysts 2 and pore layers 3 provided between the sheet-like unit, catalysts 2.

A mean thickness of the sheet-like unit catalysts 2 is in the range of 4 to 30 nm.

It is generally known that a catalytic reaction takes place mainly on the surface of the catalyst layer. Accordingly, the usage efficiency of the catalyst in the catalyst layer is proportional to a specific surface area of the catalyst. The sheet-like unit catalyst 2 in accordance with the embodiment has a smaller specific surface area than a conventionally known particulate catalyst (e.g. nano catalyst particles, each having a particle size of 2 to 5 nm), but has a higher mass activity than the particulate catalyst even when both the catalysts have the same catalyst composition. Although the reason therefor has not been completely clarified, the reason is considered as follows. The catalyst activity strongly depends on a surface structure of the catalyst layer and the sheet-like unit catalyst 2 has a surface structure different from that of the conventional catalyst. A rate of active sites with high activity on the surface of the sheet-like unit catalyst 2 is larger than that of the conventional catalyst. In the embodiments, a high usage efficiency and high durability are considered to be made compatible with each other. The compatibility is also considered to be enabled by optimizing the mean thickness of the sheet-like unit catalyst 2 and forming a laminated structure having the pore layer 3 between the sheet-like unit catalysts 2 to form the sheet-like unit catalysts 2.

Further, for example in the electrode of the polymer electrolyte electrochemical cell, the usage efficiency of the catalyst in a catalyst layer strongly depends on a density of a three-phase interface formed of a reactant, a catalyst and a proton conductor. Hence the catalyst layer is preferably made to be porous so as to have as many three-phase interfaces as possible. In the catalyst layer of the embodiment, the pore layers 3 in the catalyst layer 1 allow substances such as the reactant and the product to smoothly move, and allow an electrode reaction to effectively take place on the surface of the sheet-like unit catalyst 2.

The surface structure of the sheet-like unit catalyst 2 depends on the thickness thereof which also influences the activity and the durability of the sheet-like unit catalyst 2. For this reason, a mean thickness of the sheet-like unit catalyst 2 was set to 4 to 30 nm in the embodiment. If the sheet-like unit catalyst 2 is extremely thin, high durability, cycle durability in particular, cannot be obtained as a catalyst layer 1, thereby resulting in insufficient stability of the surface active sites. On the other hand, if the sheet-like unit catalyst 2 is extremely thick, the usage efficiency of the catalyst of the catalyst layer 1 decreases, thereby requiring an increase in the amount of catalyst for obtaining sufficient characteristics, which causes a total cost increase in catalyst layer 1. Therefore, the mean thickness of the sheet-like unit catalyst 2 was set to 4 to 30 nm. The mean thickness is preferably from 4 to 10 nm, and more preferably from 4 to 8 nm.

It should be noted that the sheet-like unit catalyst 2 of the embodiment is defined as a sheet-like unit catalyst including a catalyst sheet of which aspect ratio (length/thickness) is not smaller than 2 in a cross-sectional observation of the catalyst sheet.

A SEM observation revealed that the sheet-like unit catalyst 2 of the embodiment is sheet-like as shown in FIG. 1. An SEM can provide a depth profile of a sample more easily than a TEM (transmission electron microscope), thereby allowing it to confirm that the sheet-like unit catalyst 2 is sheet-like. Therefore, the SEM is a preferable means to observe the sheet-like units of the sheet-like unit catalyst 2.

In addition, the sheet-like unit catalyst 2 is defined as being sheet-like and having a sheet of which has an aspect ratio (length/thickness) of not smaller than 2 and a length of not smaller than 10 nm on the cross section thereof. The definition is to structurally differentiate the sheet-like unit catalyst 2 from a conventional particulate catalyst.

Figure 2:
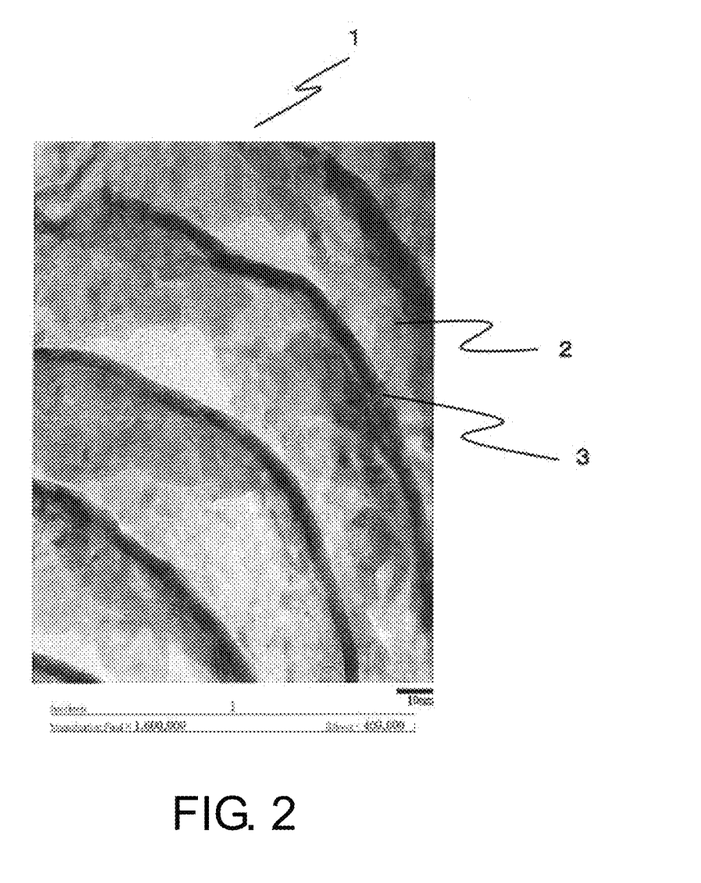
FIG. 2 is a TEM image showing a portion of an enlarged cross section of the catalyst layer.

The length and thickness of the sheet on the cross section of the sheet-like unit catalyst 2 can be confirmed using a TEM observation. FIG. 2 is a TEM image showing a portion of an enlarged cross section of the catalyst layer 1. The TEM observation reveals that the catalyst layer 1 has a structure including the sheet-like unit catalysts 2 and the pore layers 3 sandwiched between the sheet-like unit catalysts 2.

The mean thickness of the pore layer 3 between the sheet-like unit catalysts 2 in the embodiment is preferably from 7 to 500 nm. If the pore layer 3 is extremely thin in the mean, a porosity of the catalyst layer 1 becomes low to cause insufficient supply of a fuel and exhaust of a product generated through an electrode reaction. On the other hand, if the pore layer 3 is extremely thick in the mean, the characteristic-improving effect due to introduction of the pore layers 3 becomes small to likely cause a cost increase of the manufacturing process and to accidentally cause the sheet-like unit catalyst 2 to flow out at the pore-forming step. On this account, the mean thickness of the pore layer 3 is preferably set to 7 to 500 nm. The mean thickness is preferably from 7 to 400 nm, and more preferably from 7 to 250 nm.

The sheet-like unit catalysts 2 preferably account for not smaller than 60% of the entire catalyst layer 1 in the embodiment on the cross section basis. If the sheet-like unit catalysts 2 account for an extremely small percentage thereof, the configuration of the embodiment has little characteristic-improving effect.

Alternatively, projections of the catalyst may be formed on the surface of the sheet-like unit catalyst 2 of the embodiment. The projections have a height of 10 nm or less. The projections may be related also to the surface structure and a high proportion of the high active sites of the sheet-like unit catalyst 2.

Further, it is preferable that the sheet-like unit catalyst 2 of the embodiment does not substantially include pores and is two-dimensionally continuous. Removing the pores from the sheet-like unit catalyst 2 enables both high usage efficiency and excellent durability, e.g. cycle durability in particular, of the catalyst. In addition, although it is ideal for the sheet-like unit catalyst 2 to include almost no pores, the sheet-like unit catalyst 2 may include a certain amount or less of pores. The number of continuous pores having a diameter of 1 nm or more is preferably 3 or less (including 0) over a length of 20 nm of the sheet-like unit catalyst 2 and from a side to the other side in the thickness direction thereof. A sectional TEM observation enables evaluation of the amount of the pores.

Figure 3:
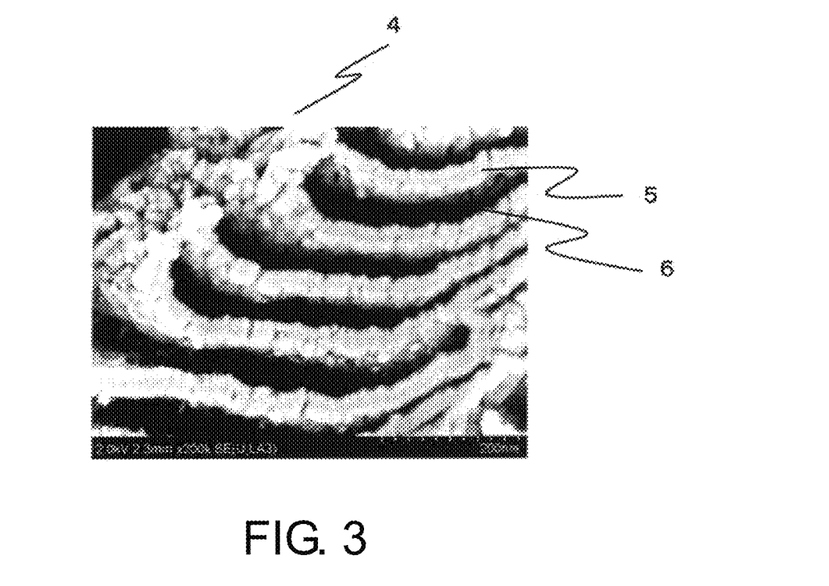
FIG. 3 is a SEM image showing an enlarged portion of a conventional particulate catalyst.

FIG. 3 is a SEM image showing an enlarged portion of a conventional particulate catalyst. A particle unit catalyst 5 included in a particulate catalyst layer 4 is an aggregate of catalyst particles and includes many pores inside the particle unit catalyst 5. It can be understood that the particle unit catalyst 5 is different in the structure thereof from the sheet-like unit catalyst 2 of the embodiment. The numeral 6 in FIG. 3 denotes an pore layer.

Hereinafter, confirming and measuring methods of each configuration of the embodiment will be described below.

First, the catalyst layer 1 is cut. For example when the catalyst layer 1 is a rectangle, the catalyst layer 1 is cut at the centers of short sides thereof parallel to long sides thereof, and a central position of the cut surface is a site for observation and measurement.

The cross section of the measurement position is observed using an SEM at a magnification of 200,000 times to confirm that the catalyst layer 1 has the laminated structure including the sheet-like unit catalysts 2 and the pore layers 3.

Next, three cross sections are observed using a TEM at a magnification of 1.6 million times. Three cross-sectional TEM images are taken at each of an upper portion, a middle portion and a lower portion of the catalyst layer 1 (9 images) to measure the lengths and thicknesses of the upper portion, the middle portion and the lower portion in the sheet-like catalyst 2, respectively. The measuring provides an aspect ratio of the catalyst to confirm a sheet-like catalyst. The respective thicknesses are based on the mean value of 3 values which are measured at the center of the sheet-like unit catalyst 2 and at the two positions inner by 25% from both ends thereof in the images.

The number of pores included in the sheet-like unit catalyst 2 is based on a mean value of continuous pores each having a diameter of 1 nm or more. The continuous pores can be differentiated from the catalyst portions of the sheet-like unit catalysts 2 by the TEM image contrast to allow it to observe the continuous pores in the thickness direction from one side to the other side of the sheet-like unit catalyst 2. The mean number of pores included therein is derived from the number of pores in the 9 images.

A proportion of the sheet-like unit catalysts 2 to the entire catalyst layer 1 is calculated by measuring a total area of the sheet-like unit catalysts 2 and the entire catalyst layer 1 included in each of the 9 images. The calculating allows calculation of a proportion of the total area of the sheet-like unit catalysts 2 divided by the area of the entire catalyst layer 1. A mean value of the obtained proportions in the 9 images is employed in the embodiment.

The thickness of the pore layer 3 can be measured in a measuring method similar to that for the thickness of the sheet-like unit catalyst described above.

As a catalyst material to be included in the sheet-like unit catalyst 2, a conventionally known catalyst material can be employed. Specifically, the material preferably has favorable catalytic activity, conductivity and stability. Examples thereof include a noble-metal based catalyst. The noble-metal based catalyst refers to a catalyst including at least one or more noble metal elements selected from the group consisting of Pt, Ru, Rh, Os, Ir, Pd, Au, etc. These noble-metal based catalysts are desirably alloyed with other elements to be used, or used as a composite oxide with other elements. It should be noted that the catalyst material is not limited to the noble metal based catalysts. Alternatively, a variety of catalyst materials may be employed, e.g., as an oxide based catalyst, a nitride based catalyst and a carbide based catalyst.

Pt is used as a catalyst material for hydrogen oxidation reaction or hydrogen generation reaction. $Pt_yRu_zT_{1-y-z}$ ($0.2 \leq y \leq 0.8$, $0 \leq z \leq 0.8$, and T is at least one element selected from the group consisting of W, Hf, Si, Mo, Ta, Ti, Zr, Ni, Co, Nb, V, Sn, Al and Cr) is used as a catalyst material for oxidation reaction, such as a reforming hydrogen gas (containing CO) or alcohol (methanol, ethanol, etc.) $Pt_uM_{1-u}$ ($0 \leq u \leq 0.9$, and M is at least one element selected from the group consisting of Co, Ni, Fe, Mn, Ta, W, Hf, Si, Mo, Ti, Zr, Nb, V, Cr, Al, and Sn) is used as a catalyst material for oxygen reduction reaction, for example. A mixed oxide including an oxide of Ir, Ru, Rh or Os and an oxide of Ta or Sn is used as a catalyst material for oxygen generation reaction.

The sheet-like unit catalyst 2 of the embodiment may be an aggregate of an amorphous catalyst and a crystal catalyst.

In addition, the catalyst layer 1 of the embodiment is produced directly, e.g. on a porous substrate as will be described later in a manufacturing method, thereby allowing the catalyst layer 1 to include a certain amount or less of particle-like catalyst. In this case, the particle-like catalyst preferably accounts for less than 40% of the catalyst layer 1. This is because an excessively large amount of the particle-like catalyst reduces the effect of the catalyst layer 1 of the embodiment. The particle-like catalyst more preferably accounts for 35% or less thereof and much more preferably accounts for 30% or less thereof. The amount of the particle-like catalyst can be measured in the same manner as the above-mentioned measuring of the amount of the sheet-like unit catalyst.

The catalyst, layer of the embodiment preferably has a laminated structure with the sheet-like unit catalysts 2 laminated in the thickness direction thereof. Forming the sheet-like unit catalysts 2 in the laminated structure can further enhance the activity of the catalyst and improve the usage efficiency thereof. This is probably because the surface structure and the surface electron state of the sheet-like unit catalysts 2 can be improved by an interaction between the respective sheet-like units included in the sheet-like unit catalysts 2.

In the embodiment, a sandwich structure is preferably formed such that:

the sandwich structure includes at least three layers in the thickness direction of the sheet-like unit catalyst 2; and the outermost layer of the laminated structure includes at least a noble metal to have a composition different from that of inner layers sandwiched between the outermost layers. Particularly, at least one or more of Pt, Ir and the like which have high stability are preferably used as an element included in a surface layer. Further, at least one or more of W, Ta, Zr, Cr, Nb, Ni, Co, Cr, Pd, and Au are preferably used as an element included in the inner layer. Such a combination of both the surface layers and the inner layer improves the characteristics of the catalyst, and also leads to a cost reduction in the entire catalyst due to a reduced usage of the noble metals.

When the sheet-like unit catalyst 2 forms a laminated structure, at least one of the outermost layers of the sheet-like unit catalyst 2 desirably has a mean thickness of 0.2 to 5 nm. This is because the characteristic such as durability may be unstable if the outermost layer is extremely thin, and the improvement in usage efficiency is small if the outermost layer is extremely thick. A preferable mean thickness of the outermost layer ranges from 0.2 to 4 nm.

In order to obtain the mean thickness of the outermost layer, the catalyst layer 1 is cut in the same way as in the thickness measurement of the sheet-like unit catalyst 2. For example, when the catalyst layer 1 is a rectangle, the catalyst layer 1 is cut at the centers of short sides thereof parallel to long sides thereof, and a central position of the cut surface is a site for observation and measurement.

Next, a cross section of the sheet-like unit catalyst 2 is observed using a TEM at a magnification of 1.6 million times to measure the thickness thereof by means of element mapping. The thickness is based on the mean value of 3 values which are measured in the center of the sheet-like unit catalyst 2 and at the two positions located inner by 25% from both ends thereof in the images taken at the three points.

In order to surely obtain a sufficient amount of catalyst, it is preferable that the catalyst layer 1 includes 3 to 500 sheet-like unit catalysts 2 to be laminated and pore layers sandwiched between the respective sheet-like unit catalysts 2. Laminating 3 or more sheet-like unit catalysts 2 satisfies high usage efficiency, high durability and a sufficient loading amount of catalyst simultaneously. In addition, laminating 500 or less sheet-like unit catalysts 2 is preferable. This is because the excessively large number of sheet-like unit catalysts 2 to be laminated causes a cost increase including a manufacturing cost, insufficient fuel supply, and insufficient exhaust of product by an electrode reaction. The maximum number of sheet-like unit catalysts 2 is preferably 300 or less, and is more preferably 200 or less.

Alternatively, oxide or nitride particles may be included between the sheet-like unit catalysts, that is, inside the pore layers in the embodiment. The particles can suppress agglomeration and anomalous growth of the sheet-like unit catalysts. In addition, the particles maintain the laminated structure to enhance material movement such as fuel diffusion and proton conductivity.

Oxide or nitride ceramic particles preferably have a mean diameter of 50 nm or less. When the mean diameter exceeds 50 nm, the catalyst layer tends to have increased resistance and to provide insufficient cell characteristics. When different oxides are included in the pore layers, a special interface structure is likely to be formed between the different oxides and to have solid acidity which promotes proton conductivity. The special interface structure forms proton conductivity paths to enhance an electrode catalytic reaction, thereby leading to high usage efficiency and high durability of the catalyst material. Insufficient proton conductivity can be improved by making the ceramic particles include at least one element selected from the group consisting of Zr, Ti, Ru, Si, Al, Sn, Hf, Ge, Ga, In, Ce, Nb, W, Mo, Cr, B and V. These elements make it easy to introduce solid acidity.

Figure 4:
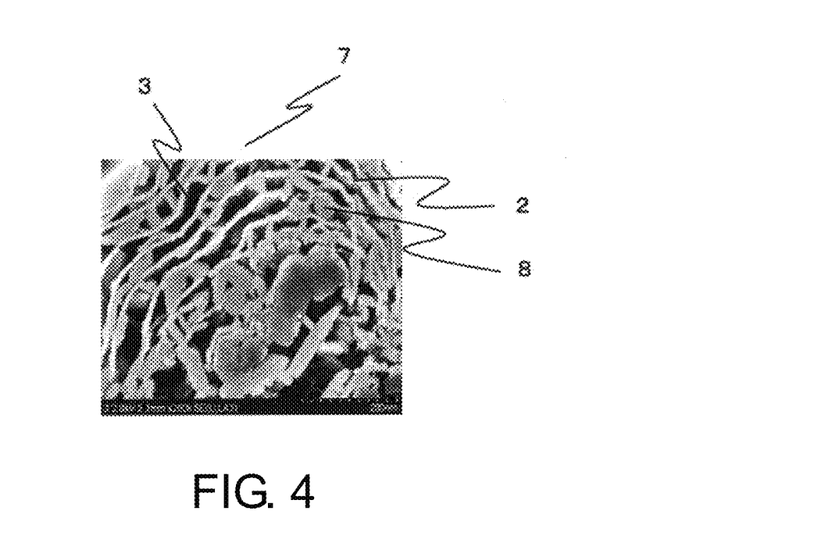
FIG. 4 is a SEM image enlarging a portion of a cross section of a catalyst layer.

FIG. 4 is a SEM image enlarging a portion of a cross section of a catalyst layer 7. The image shows a structure including a ceramic particle 8 and an pore layer 3 between sheet-like unit catalysts 2.

Next, a manufacturing method of the catalyst layer of the embodiment will be described with reference to drawings.

Figure 5A:
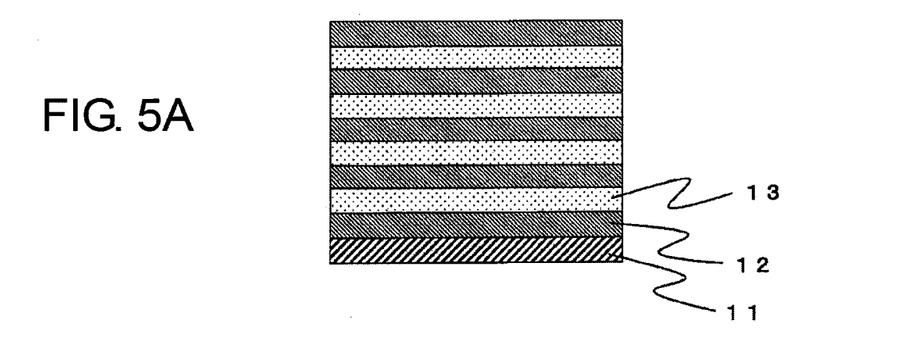
FIGS. 5A to 5C are views showing manufacturing steps of the catalyst layer.
Figure 5B:
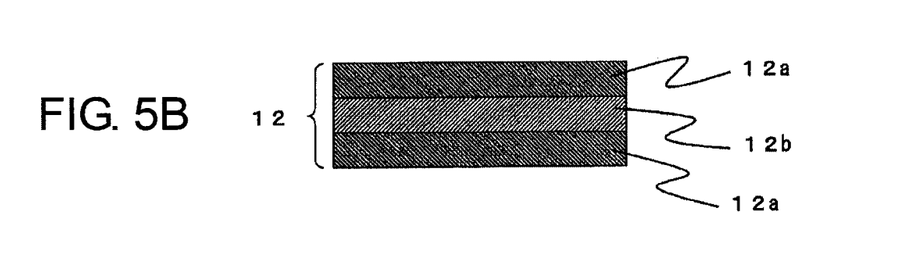
Figure 5C:
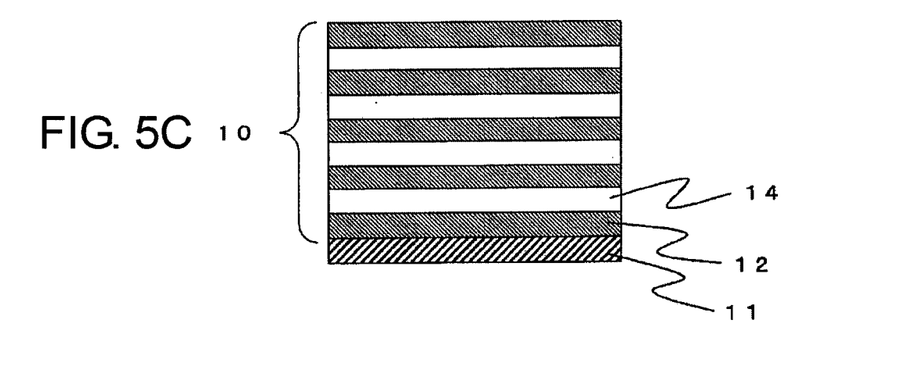

FIGS. 5A to 5C are views schematically showing manufacturing steps of the catalyst layer of the embodiment.

First Step: Producing Step of Sheet-Like Unit Catalyst

First, as shown in FIG. 5A, a sheet-like unit catalyst 12 is formed on a substrate 11 by sputtering a target including a catalyst material, or by vapor deposition, for example.

When the catalyst of the embodiment is used for an electrochemical cell, a porous substrate is preferably used as the substrate 11. For example, when using the substrate 11 as a diffusion layer of a fuel cell or an electrolytic cell, a conductive substrate or a proton conductive substrate can used, and a conductive porous substrate is preferable. As the conductive porous substrate, a substrate including a material having gas permeability or liquid permeability can be used. For example, porous paper or paper cloth including a carbon material such as carbon cloth or carbon paper can be used. Further, when using the substrate 11 as an oxygen-generating electrode, a Ti mesh, for example, which is excellent in corrosion resistance or durability can be employed for the substrate 11. The substrate 11 is not limited to a Ti mesh only if the substrate 11 is a carrier excellent in conductivity and stability. Examples of the substrate 11 include a ceramic porous substrate having conductivity.

At the first step, the sheet-like unit catalysts 12 are laminated to provide a laminated structure (12a/12b/12a) where the sheet-like unit catalysts 12 are laminated in the thickness direction thereof as shown in FIG. 5B. The layers 12a and 12b are formed by sputtering targets including these catalyst materials having different compositions or by vapor deposition. Specifically, the layer 12a is formed by sputtering a target of a first catalyst material or by vapor deposition. Next, the layer 12b is formed on the layer 12a by sputtering a target of a second catalyst material or by vapor deposition. Further, the layer 12a is formed on the layer 12b by sputtering the target of the first catalyst material or by vapor deposition. As a result, the laminated structure with the layer 12b sandwiched between the two layers 12a is obtained.

Second Step: Forming Step of Pore Layer

In order to obtain an pore layer included in the catalyst layer of the embodiment, a forming layer 13 of an pore layer is formed on the sheet-like unit, catalyst 12 formed at the first step, as shown in FIG. 5A.

Specifically, the forming layer 13 for forming the pore layer is formed by sputtering a target including a material of the forming layer 13 or by vapor deposition of the material. Hereinafter, a forming layer for forming an pore layer is referred to as an "pore forming layer."

A material of the pore forming layer 13 is not limited to a material of a specific composition only if the material can be removed by dissolving with acid or alkaline cleaning at later steps of forming pore layers. Examples of the pore forming material include metals and metal oxides. Among metals and metal oxides, metals are preferable for workability or costs. The preferable metals include at least one selected from the group consisting of Mn, Fe, Co, Ni, Zn, Sn, Al and Cu. Hereinafter, the material of the pore forming layers is referred to as the pore forming material.

Further, in the embodiment, particles of an oxide, a nitride or the like can be included between the sheet-like unit catalysts, i.e., inside an pore layer. In this case, a refractory metal, e.g., W or Ta is used for the pore forming layer, thereby allowing oxide particles of the refractory metal to be included inside the pore layers at later steps of forming the pore layers. When different particles are included in the pore layers, a special interface structure is likely to be formed between the different particles and to have solid acidity which promotes proton conductivity. Therefore, co-sputtering or successive sputtering can be employed to form different oxide or nitride particles. Oxygen can be introduced to the sputtering atmosphere to control structures and stability of the oxide particles. In the sputtering, an oxygen partial pressure is preferably set to less than 20%.

Third Step: Forming Step of Laminated Structure

The first step and the second step are repeated two or more times to provide the laminated structure including the sheet-like unit catalysts 12 and the pore forming layers 13, as shown in FIG. 5A. The first step is to form a sheet-like unit catalyst. The second step is to form an pore forming layer. The laminated structure preferably includes 3 to 500 layers of the sheet-like unit catalysts 12 and 3 to 500 layers of the pore forming layers 13 between the sheet-like unit catalysts 12. The 3 to 500 layers are to acquire a sufficient amount of a catalyst. Alternatively, the first step is to form an pore forming layer and the second step may be to form a sheet-like unit catalyst.

In the embodiment, controlling target compositions in sputtering or vapor deposition can give a composition gradient over the respective layers of the sheet-like unit catalysts and the pore forming layers during the sputtering or the vapor deposition thereof. The composition gradient can provide porous catalyst layers with a porosity gradient or different functions after forming the pore layers to be described later. For example, a sheet-like oxygen reduction catalyst is formed on the side of the electrolyte membrane of PEFC and a sheet-like oxygen generation catalyst is formed on the side of the substrate material thereof, thereby allowing it to control instantaneously high voltage of an on-board fuel cell and an adverse effect on durability due thereto.

Fourth Step: Forming Step of Pore Layer

A laminate including the sheet-like unit catalysts 12 and the pore forming layers 13 as shown in FIG. 5A undergoes processing to form pore layers. The processing provides a laminated structure including the sheet-like unit catalysts 12 and pore layers 14 to be sandwiched between the sheet-like unit catalysts 12, as shown in FIG. 5C. Alternatively, oxide particles or nitride particles may be included in the pore layers 14.

The pore layers are preferably formed by acid cleaning to remove the material of the pore forming layers by dissolving. The processing to form the pore layers is not limited to the acid cleaning. Alternatively, different processing can be employed to acquire a sufficient pore structure. Examples for the different processing include alkaline cleaning and electrolytic method to form an pore layer.

In order to form the pore layer by acid cleaning, for example, the laminate obtained at the third step is immersed into a nitric acid, hydrochloric acid, sulfuric acid or a mixed solution of these for 5 to 50 hrs, to dissolve and remove the pore forming material. The laminate may be heated to about 50 to 100° C. during the immersing. Alternatively, a bias voltage may be applied or after-treatment such as thermal treatment may be added so as to promote dissolution of the pore forming material in some cases.

Alternatively, a means to fix the sheet-like unit catalyst 12 to the substrate 11 may be added in order to control outflow of the catalyst due to the forming step of the pore layer. For example, the laminate is immersed into a polymer solution such as NAFION® (brand name of Du Pont) before forming the pore layer, and then dried. The pore layer is formed after the drying of the laminate.

Alternatively, the laminate may be provided with a polymer solution such as NAFION® (brand name of Du Pont) by spraying or impregnating in order to enhance proton conduction of the laminate or adhesion thereof with other materials after forming the pore layer.

In addition, the pore forming material may be partially left after forming the pore layer. These residual metals can form stable oxides, and are likely to contribute to reduced growth of the sheet-like unit catalyst, maintenance of the laminated structure, enhancement of proton conduction, and the like.

While the catalyst layer of the embodiment can be obtained with the above-described manufacturing method, a step may be added to the above-described manufacturing method. Alternatively, another manufacturing method may be employed as long as the embodiment can be enabled.

For example, for the sheet-like unit, catalyst including a laminated structure of which lamination direction is in the thickness direction, a manufacturing method to be described below can be used to make the outermost layer of the sheet-like unit catalyst more homogeneous and thus allows higher usage efficiency and durability.

A producing method will be described below, in which a noble metal (e.g. Pt, Ru, Ir) is used for the outermost layer of the sheet-like unit catalyst which includes a laminated structure of which lamination direction is in the thickness direction.

First, a precursor of the sheet-like unit catalyst is formed in the same way as at the first step. The precursor is chemically stable in a pore-forming process and is not particularly limited as long as a sheet can be formed. A material including Pd, Au, Ta, Zr, Cr, Nb, W, Ni, Co, Cu can be used for the precursor. Except for the forming step of the precursor, steps similar to the first step provide a laminated structure including the precursors of the sheet-like unit catalysts and the pore layer.

Second, the laminated structure is immersed into a first solution. The first solution contains cations (e.g. $Cu^{2+}$, $Co^{2+}$, etc.) of a metal element having a lower standard redox potential than that of the noble metal (hereinafter referred to as "metal A"). The immersing of the laminate deposits the metal A on the surface of the precursor of the sheet-like unit catalyst by electrochemical underpotential deposition (UPD). Subsequently, the laminated structure is immersed into a second solution. The second solution contains cations (e.g. $Pt^{2+}$, $Ru^{2+}$, etc.) of the noble metal to replace the metal A on the surface of the precursor of the sheet-like unit catalyst with the noble metal. This replacement forms a noble metal atomic layer on the surface of the precursor of the sheet-like unit catalyst and produces a sheet-like unit catalyst with a laminated structure including the precursor of the sheet-like unit catalyst and the noble metal layer. Repeating the above-mentioned steps forms a thick noble metal surface layer on the surface of the precursor of the sheet-like unit catalyst. The surface layer of the precursor of the sheet-like unit catalyst in the above manufacturing method may be as thick as the above-described outermost layer of the sheet-like unit catalyst. Forming too thick a surface layer leads to increased manufacturing cost and a small improving effect of catalyst usage efficiency. Therefore, the mean thickness thereof is desirably not larger than 2 nm.

Further, when the precursor of the sheet-like unit catalyst or the pore forming layer contains a metal having a lower standard redox potential than the noble metal, just immersing this laminate into an acid solution containing noble metal ions (e.g. $Pt^{2+}$, $Ru^{2+}$ can form an atomic layer of noble metal on the surface of the precursor of the sheet-like unit catalyst. The immersing of the laminate allows it to form a sheet-like unit catalyst of sandwich type which has a laminated structure with the precursor of the sheet-like unit catalyst and the noble metal laminated.

Figure 6:
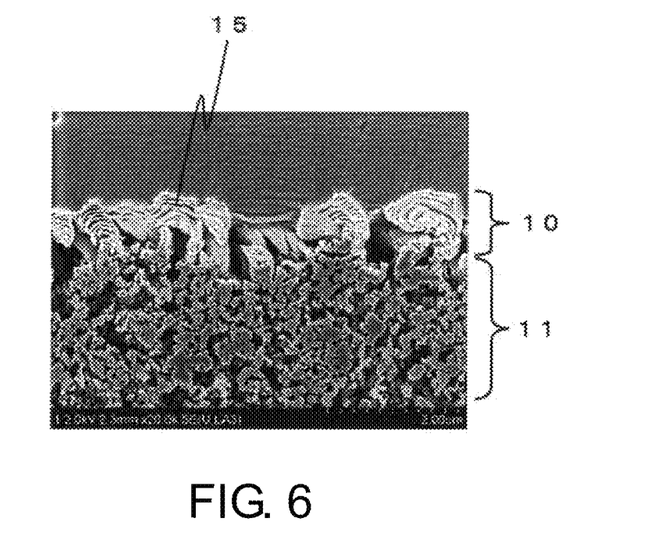
FIG. 6 is a sectional SEM image of a catalyst layer formed as a typical unit.

The catalyst layer of the embodiment can be formed on the porous substrate as a unit. FIG. 6 is a sectional SEM image of the catalyst layer 10 formed as a typical unit 15. It can be seen that the catalyst layer 10 of the embodiment is formed on the porous substrate 11. A size of the unit 15 strongly depends on the substrate structure, the catalyst composition, and the like. For example, when using the unit 15 for a fuel cell as an electrochemical cell, it is important to supply a fuel to the sheet-like unit catalysts inside the catalyst layer or to exhaust products such as carbon dioxide generated in a catalytic reaction for characteristics of the electrochemical cell in a high current density. The whole size of the catalyst layer is preferably 2000 nm or less to allow it to perform the fuel supply and the products exhaust smoothly. The thickness of the catalyst layer is preferably 500 nm or less and is more preferably 100 nm or less. Appropriately selecting the porous substrate can control the unit size of the catalyst layer. For example, a catalyst layer with a unit size of 100 nm or less is easy to be formed on the porous substrate including fibrous carbon with a mean diameter of 50 nm or less.

Second Embodiment

A membrane electrode assembly (MEA) of a second embodiment will be described below.

Figure 7:
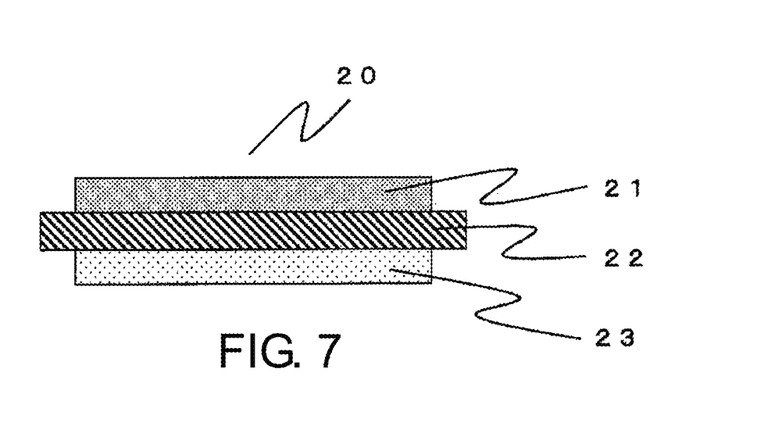
FIG. 7 is a sectional view schematically showing a membrane electrode assembly including a catalyst layer of the first embodiment.

FIG. 7 is a sectional view schematically showing a MEA including a catalyst layer of the first embodiment.

For example, the MEA is used for a fuel cell as an electrochemical cell. The MEA basically includes a polyelectrolyte membrane 22, and two electrodes with the polyelectrolyte membrane 22 sandwiched therebetween, i.e., a fuel electrode (anode) 21 to be supplied with hydrogen and an air electrode (cathode) 23 to be supplied with oxygen. The anode 21 includes a diffusion layer and an anode catalyst layer laminated thereon. The cathode 23 includes a diffusion layer and a cathode catalyst layer laminated thereon. The anode 21 and the cathode 23 are laminated via the polyelectrolyte membrane 22 such that the anode catalyst layer and the cathode catalyst layer face each other. Then, the catalyst layer of the first embodiment is provided to at least either one of the anode catalyst layer and the cathode catalyst layer.

The substrate for forming the catalyst layer in the first embodiment can be used as a diffusion layer of each catalyst layer. The substrate preferably contains a water repellent. The water repellent enhances water repellency to prevent a so-called flooding phenomenon in which water produced by electric power generation is not drained from the inside of the catalyst layer to cause clogged drain. The water repellent is not limited specifically. Examples thereof include fluorinated polymer materials such as polytetrafluoroethylene (PTFE), polyvinylidene fluoride (PVDF), polyhexafluoropropylene and a tetrafluoroethylene-hexafluoropropylene copolymer (FEP). The water repellent is to be introduced into the substrate after forming the catalyst layer of the first embodiment.

A proton-conductive material contained in the polyelectrolyte membrane 22 of the MEA is not limited as long as being a material capable of transmitting protons. Examples of the proton-conductive material include fluorocarbon resins having a sulfonic acid group such as NAFION® (brand name, manufactured by Du Pont), FLEMION® (brand name, manufactured by Asahi Kasei Corporation) and ACIPLEX® (manufactured by Asahi Glass Co., Ltd.), and inorganic materials such as tungstic acid and phosphorus tungstate. However, the proton-conductive material is not limited to the above mentioned. A thickness of the polyelectrolyte membrane 22 may be determined by appropriately considering the characteristics of the obtained MEA 20. The thickness preferably ranges from 5 to 300 µm, and more preferably ranges from 10 to 150 µm. The thickness is preferably 5 µm or less from the viewpoints of the strength during formation of membrane and the durability during operation of the MEA 20. The thickness is preferably 300 µm or less from the viewpoint of output characteristics during operation of the MEA.

The polyelectrolyte membrane 22 is bonded to the anode 21 and the cathode 23 by heating or pressurizing. Typically, the bonding is performed with a hot press. A press temperature during the hot pressing may be not lower than a glass-transition temperature of the polymeric electrolyte to be used as a binder for electrodes and an electrolyte membrane. The press temperature generally ranges from 100 to 400° C. The press pressure depends on hardness of the electrode to be used, and normally ranges from 5 to 200 kg/cm$^2$.

Third Embodiment

An electrochemical cell of a third embodiment will be described below.

The third embodiment relates to an electrochemical cell provided with the MEA of the second embodiment.

As an example of the electrochemical cell, a fuel cell includes the MEA of the second embodiment, a means for supplying a fuel to the anode, and a means for supplying an oxidant to the cathode. In addition to the MEA, a fuel-cell flow channel plate is provided to the fuel cell, and a porous fuel-diffusion layer may further be provided between the MEA and the fuel-cell flow channel plate. Specifically, the MEA is incorporated into an anode holder and a cathode holder. The anode holder has a fuel supply groove for supplying hydrogen or the like as a fuel to an anode. The cathode holder has an oxidant-gas supply groove for supplying air (oxygen) from a supplying body for supplying an oxidant to a cathode. The number of MEAs to be used may be one or more. Using two or more MEAs can provide a higher electromotive force. For example, a plane arrangement structure or a stack structure may be formed, in which the MEAs are laminated to be connected in series between the anode holder and the cathode holder. The shape or the like of the fuel cell is not particularly limited, and may be determined appropriately depending on a desired cell characteristic such as voltage.

As the fuel to be used for this fuel cell, a water solution can be used in addition to hydrogen and a reformed gas. The water solution contains at least one selected from the group consisting of methanol, ethanol, and formic acid.

The fuel cell has been described as an example of the third embodiment, but the example can be employed also for another electrochemical cell, e.g., an electrolytic cell as an electrochemical cell. For example, the electrochemical cell can be an electrolytic cell when the electrochemical cell has a configuration where the anode of the fuel cell has been replaced with an oxygen generation catalyst electrode. Further, the catalyst layer is also applicable to an electrochemical cell of MEMS (micro electro mechanical system) type.

Hereinafter, the embodiments will be specifically described with reference to examples and comparative examples.

EXAMPLES 1 TO 13

First Step

A piece of carbon paper (brand name: TORAY 060, manufactured by Toray Industries, Inc.) was used as a substrate. The piece of carbon paper had a carbon layer with a thickness of 5 to 50 µm. Sheet-like unit catalysts were formed by sputtering targets of the respective catalyst material compositions (atomic %) listed in TABLE 1 so that the respective compositions and thicknesses of the sheet-like unit catalysts were obtained as listed in TABLE 1. When the sheet-like unit catalyst has a laminated structure of layers laminated in the thickness direction thereof, each of the layers was formed by sputtering each target for the layers to have the prescribed composition and thickness listed in TABLE 1. In the case of the sheet-like unit catalyst having the laminated structure being laminated in the thickness direction thereof, layers with compositional elements and thicknesses shown in Table 1 were formed by sputtering In Table 1, the thicknesses of the respective layers are denoted as first layer/second layer/third layer for the sheet-like unit catalyst having the laminated structure with layers laminated in the thickness direction thereof.

Second Step

An pore forming layer was formed by sputtering a target of a material for forming the pore layer on the sheet-like unit catalyst obtained in the first step. As a result, the pore forming layers with various compositions and thicknesses listed in Table 1 were formed.

Third Step

The first step and the second step were repeated to produce a laminate so that a total loading amount of a noble metal such as Pt in the entire catalyst layer was 0.10 mg/cm$^2$. In addition, a Pt loading amount of 0.1 mg/cm$^2$ corresponds to a total Pt thickness of about 50 nm.

Fourth Step

The laminate obtained at the third step was subjected to acid treatment of immersing the laminate into aqueous solution at 80° C. for two hours. The sulfuric acid aqueous solution contained 10 wt % of sulfuric acid. Subsequently, the laminate was cleaned with pure water and dried to obtain the catalyst layer of the embodiment on the substrate.

Here, in examples 9 and 11, the pore forming materials contain W, and hence the pore layers contain W oxides after the pore layer is formed.

EXAMPLES 14 TO 16

A precursor of the sheet-like unit catalyst was formed by a manufacturing method similar to the first step of the above-mentioned examples 1 to 13. Materials for the precursor are Pd, TaNi, and NbW in the examples 13, 14, and 15, respectively.

Steps similar to the above-mentioned steps in the examples 1 to 13 were performed except for the forming step of the precursor, thereby providing a laminated structure having the precursors of the sheet-like unit catalysts and the pore layers.

The laminate was immersed into an aqueous solution and held at a potential in a nitrogen atmosphere. The aqueous solution contained 100 mM of $CuSo_4$ and 100 mM of $H_2SO_4$. The potential was not larger than 0.34V (reference electrode: standard hydrogen electrode). This immersing deposited Cu on the surface of the precursor of the sheet-like unit catalyst by electrochemical underpotential deposition. Subsequently, the laminate was cleaned with pure water, and then immersed into an aqueous solution containing $K_2PtCl_4$ and 50 mM of $H_2SO_4$, thereby replacing Cu with Pt. After repeating this step several times, the laminate was cleaned with pure water and dried, thereby providing the catalyst layer of the embodiment on the substrate.

EXAMPLE 17

A precursor of the sheet-like unit catalyst is formed with a manufacturing method similar to the first step of the above-mentioned examples 1 to 13. A material for the precursor is TaW.

Next, steps similar to the above-mentioned steps in the examples 1 to 12 were performed except for the forming step of the precursor to obtain a laminated structure having the precursors of the Sheet-like unit catalysts and the pore layers.

The laminate was immersed into an aqueous solution containing 100 mM of $CuSo_4$ and 100 mM of 112504. Subsequently, the laminate was cleared with pure water and dried, thereby providing the catalyst layer on the substrate.

COMPARATIVE EXAMPLE 1

In a comparative example 1, a single catalyst layer was formed on a substrate by sputtering a target including Pt as the catalyst material so that a loading amount of Pt was 0.10 mg/cm$^2$. A whisker substrate (organic pigment red 149, mean diameter: 50 nm) was used as the substrate

COMPARATIVE EXAMPLES 2 AND 3

Catalyst layers having thicknesses of the unit catalyst layers listed in TABLE 1 were obtained on the substrate at steps similar to the above-mentioned steps in the examples 1 to 12. The catalyst material and the pore forming material thereof are listed in TABLE 1

Evaluation of Catalyst Layer

The configuration of the catalyst layers of the examples 1 to 17 and the comparative examples 2, 3 were observed using SEM and TEM observations. The observations revealed that the catalyst layers of the examples 1 to 16 and the comparative example 3 had laminated structures including the sheet-like unit catalysts and the pore layers. The catalyst layer of the comparative example 2 had a laminated structure of a layer including aggregations of catalyst particles and the pore layer. It should be noted that oxide particles were observed and a mean diameter of the oxide particles was confirmed to be 50 nm or less in the examples 9 and 11.

TABLE 1 shows the result obtained.

The catalyst layers of the examples 1 to 17 and the comparative examples 1 to 3 were used for an anode electrode of a fuel cell as an electrochemical cell, and the electrode was evaluated.

A manufacturing method of a standard electrode for evaluating this electrode will be described as follows.

COMPARATIVE EXAMPLE 4

Pt Standard Electrode

First, 2 g of a Pt catalyst was weighed. This Pt catalyst, 5 g of pure water, 5 g of 20%-NAFION® (brand name, manufactured by Du Pont), and 20 g of 2-ethoxyethanol were sufficiently stirred and then dispersed to produce slurry. The slurry obtained was applied to water-repellent carbon paper (350 μm, manufactured by Toray Industries, Inc.) with a control coater and dried to produce a Pt-standard electrode with a Pt-catalyst loading density of 0.1 mg/cm$^2$.

In addition, the Pt-standard electrode was observed using SEM and TEM observations. The SEM and TEM observations showed no catalyst layer.

Production of MEA

A square of 3.2 cm×3.2 cm was cut out from each of the substrates having the catalyst layers in the examples 1 to 17 and the comparative examples 1 to 4 to be used as the cathode electrode with an electrode area of about 10 cm$^2$. The above-mentioned Pt-standard electrode was used as the anode electrode, and NAFION 112 (brand name, manufactured by Du Pont) as the polyelectrolyte membrane was sandwiched between the anode electrode and each of the cathode electrodes. The sandwiched therebetween was subjected to thermal compression bonding at 125° C. under a pressure of 30 kg/cm$^2$ for 10 min to produce a MEA.

Production of Fuel Cell

Using the MEA and a flow channel plate, a unit cell of a polyelectrolyte fuel cell was produced.

Evaluation of Voltage and Durability

A cell voltage of the obtained unit cell was measured under the following conditions. Hydrogen was supplied as a fuel to the anode electrode of the obtained unit cell at a flow rate of 20 ml/min, while the air was supplied to the cathode electrode of the obtained unit cell at a flow rate of 100 ml/min. The cell was discharged at a current density of 2 A/cm$^2$ with holding the cell at (35° C. to measure the cell voltage (V) after 50 hrs. TABLE 1 shows the evaluation of the cell voltage.

Figure 8:
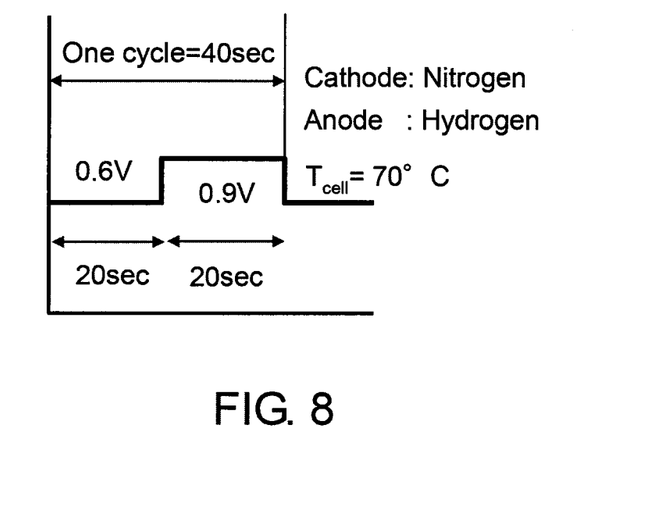
FIG. 8 is a view showing a change in a voltage for a durability test.

For evaluation of the durability, a durability test was performed. The test simulated start and stop, as shown in FIG. 8. Specifically the test was performed under the following conditions:

Hydrogen was supplied to the anode electrode at a flow rate of 40 ml/min, while nitrogen was supplied to the cathode electrode at a flow rate of 40 ml/min;

The potential cycle was repeated with holding the cell at 70° C., in which (1) the cell voltage was held at 0.6V for 20 sec and (2) the cell voltage was held at 0.9V for 20 sec; and
The cell voltage was measured after repeating 5000 of the cycles to be compared with a static cell voltage after 50 hrs. The durability is classified according to a lowering rate of the cell voltage from the static cell voltage. The durability is denoted by ⊚ when the lowering rate is 10% or less. The durability is denoted by ○ when the lowering rate is in the range from 10% to 25%. The durability is denoted by Δ when the lowering rate is 25% or more. These classifications of the durability are listed in TABLE 1.

Third Step

The first step and the second step were repeated to produce a laminate such that a total loading amount of a noble metal such as Ir in the entire catalyst layer was 0.45 mg/cm$^2$.

Fourth Step

The laminate obtained at the third step was subjected to acid treatment of immersing the laminate into a 10 wt % sulfuric-acid aqueous solution at 80° C. for 2 hrs. Subsequently, the laminate was cleaned with pure water and dried to obtain the catalyst layer of the embodiment on the substrate.

TABLE 1

| | Unit Catalyst | | | Air Gap Layer (Air gap Forming Layer) | | Oxide | | |
|---|---|---|---|---|---|---|---|---|
| | Configuration/ Composition | Thickness (nm) | Form | Configuration/ Composition | Thickness (nm) | Diameter (nm) | Voltage (V) | Durability |
| Example 1 | Pt | 4 | Sheet | Al | 40 | — | 0.86 | ○ |
| Example 2 | Pt | 6 | Sheet | Al | 40 | — | 0.86 | ○ |
| Example 3 | Pt | 12.5 | Sheet | Al | 40 | — | 0.85 | ⊚ |
| Example 4 | Pt | 25 | Sheet | Al | 40 | — | 0.85 | ⊚ |
| Example 5 | Pt | 4 | Sheet | Al | 500 | — | 0.855 | ○ |
| Example 6 | Pt | 4 | Sheet | Al | 150 | — | 0.86 | ○ |
| Example 7 | Pt$_3$NiTa | 10 | Sheet | Al | 40 | — | 0.86 | ○ |
| Example 8 | Pt/Pd/Pt | 0.5/3/0.5 | Sheet | Al | 40 | — | 0.88 | ○ |
| Example 9 | Pt/Au/Pt | 0.2/4/0.2 | Sheet | FeW | 40 | 10 | 0.88 | ⊚ |
| Example 10 | PtCo/Pd/PtCo | 1/3/1 | Sheet | Fe | 40 | — | 0.87 | ○ |
| Example 11 | Pt/PdAu/Pt | 5/3/5 | Sheet | FeWTa | 7 | 10 | 0.87 | ⊚ |
| Example 12 | Pt$_3$NiSnTa | 4 | Sheet | Fe | 40 | — | 0.87 | ○ |
| Example 13 | PtTaNi/Au/PtTaNi | 0.2/4/0.2 | Sheet | Fe | 80 | — | 0.87 | ○ |
| Example 14 | Pt/Pd/Pt | 0.5/3/0.5 | Sheet | Fe | 40 | — | 0.89 | ○ |
| Example 15 | Pt/TaNi/Pt | 0.5/4/0.5 | Sheet | Fe | 80 | — | 0.88 | ○ |
| Example 16 | Pt/NbW/Pt | 1/4/1 | Sheet | Cu | 70 | — | 0.88 | ○ |
| Example 17 | Pt/TaW/Pt | 0.5/6/0.5 | Sheet | Cu | 60 | — | 0.88 | ○ |
| Comparative Example 1 | Pt | 50 | One layer | — | — | — | 0.81 | ○ |
| Comparative Example 2 | PtMn$_3$ | 4 | agglomerated particle | Fe | 40 | — | 0.85 | Δ |
| Comparative Example 3 | Pt | 3 | sheet | Fe | 40 | — | 0.86 | Δ |
| Comparative Example 4 | Pt Standard Electrode | — | — | — | — | — | 0.48 | Δ |

As shown in TABLE 1, when the examples 1 to 17 are compared with the comparative example 4, the examples have high voltages and high durability, and have favorable characteristics to be used as the fuel cell. Consequently, using the catalyst layer having a laminated structure of the sheet-like unit catalysts and the pore layers led to improvement in characteristics of the fuel cell, particularly in cycle durability thereof. Moreover, forming the sheet-like unit catalyst of the laminated structure led to further improvement in characteristics. The oxide particles in the catalyst layer led to further improvement in durability.

EXAMPLES 18 AND 19

First Step
A sheet-like unit catalyst was formed on a substrate of a Ti-mesh by sputtering a target of a catalyst material in an atmosphere of an argon gas containing 10% of oxygen. The catalyst material compositions (atomic %) and thicknesses of the sheet-like unit catalysts are shown in TABLE 2 when the sheet-like unit catalysts have a laminated structure of layers laminated in the thickness direction.
Second Step
An pore forming layer was formed on the sheet-like unit catalyst obtained at the first step by sputtering a target of an pore forming material. The pore forming materials and thicknesses of the pore forming layers are shown in Table 2.

COMPARATIVE EXAMPLE 5

Using a catalyst material and an pore forming material shown in TABLE 2, a catalyst layer having a thickness of a unit catalyst layer shown in TABLE 2 was obtained on the substrate at steps similar to the steps in the examples 18 and 19.

COMPARATIVE EXAMPLE 6

Using a Ti-mesh as a substrate, Ir was supported by impregnation thermal treatment method on the Ti-mesh so that a loading amount of Ir was 0.45 mg/cm$^2$.
Evaluation of Catalyst Layer
The figuration of the catalyst layer in each of Embodiments 18, 19 and Comparative examples 2, 3 was observed using SEM and TEM observations. The TEM and SEM observations revealed that the catalyst layer in each of the examples 18, 19 had a laminated structure including the sheet-like unit catalysts and the pore layers. The TEM and SEM observations also revealed that the catalyst layer in the comparative example 5 had a laminated structure of a layer including aggregations of catalyst particles and an pore layer.
TABLE 2 shows the results obtained.
Production of MEA
A square of 3.2 cm×3.2 cm was cut out from each of the substrates having the catalyst layers of the examples 18, 19 and the comparative examples 5, 6 to be used as an anode electrode with an electrode area of about 10 cm². The Pt-standard electrode of the comparative example 4 was used as the cathode electrode, and NAFION 112 (brand name, manufactured by Du Pont) as the polyelectrolyte membrane was sandwiched between each of the anode electrodes and the cathode electrode. The sandwiched therebetween was then subjected to thermo-compression bonding at 125° C. under a pressure of 10 kg/cm² for 10 min to produce a MEA.

Production of Electrolytic Cell

A unit cell of a polymer electrolyte electrolytic cell was produced using the above-mentioned MEA and a flow channel plate.

Evaluation of Electrolytic Cell for Current-Voltage Characteristic and Durability Water was supplied separately to the anode side and the cathode side with holding the electrolytic cell at 30° C. The water was electrolyzed at a current of 10 A by applying an external voltage to measure the cell voltage (V) after 10 hrs. Table 2 shows the results.

For evaluation of the durability, the electrolyzation was continued to measure a cell current after 5000 hrs to be compared with another cell current after 10 hrs. The durability is classified according to a lowering rate of the cell current after 5000 hrs from the cell current after 10 hrs. The durability is denoted by ⊙ when the lowering rate is 15% or less. The durability is denoted by ○ when the lowering rate is in the range from 15% to 30%. The durability is denoted by Δ when the lowering rate is 30% or more. These classifications of the durability are listed in TABLE 2.

TABLE 2

|  | Unit Catalyst | | | Air Gap Layer (Air-gap Forming Layer) | | Oxide | | |
| --- | --- | --- | --- | --- | --- | --- | --- | --- |
|  | Configuration/ Composition | Thickness (nm) | Form | Configuration/ Composition | Thickness (nm) | Diameter (nm) | Voltage (V) | Durability |
| Example 18 | IrO2 | 4 | Sheet | Al | 40 | — | 1.5 | ⊙ |
| Example 19 | IrO2/Au/IrO2 | 2005/5/5 | Sheet | Al | 40 | — | 1.45 | ○ |
| Comparative Example 5 | IrMn | 4 | agglomerated particle | Fe | 40 | — | 1.5 | ○ |
| Comparative Example 6 | IrO2 | — | — | — | — | — | 1.6 | Δ |

As shown in TABLE 2, when comparing the examples 18, 19 with the comparative examples 5, 6, the embodiment allows a similar electrolytic current to flow even with a low cell voltage, and the cell has high durability, and has favorable characteristics when used as the electrolytic cell. The use of the catalyst layer formed in a layered structure including the sheet-like unit catalysts and the pore layers led to improvement in characteristics of the fuel cell, particularly in durability thereof. Moreover, forming the sheet-like unit catalyst in a laminated structure led to further improvement in characteristics.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A catalyst layer comprising a layered structure, which is laminated with sheet-like unit catalyst layers and void layers, each of the sheet-like unit catalyst layers has a mean thickness of 4 to 30 nm, each of the void layers being sandwiched between two of the sheet-like unit catalyst layers, and wherein
the void layer in the structure directly contacts two adjacent sheet-like unit catalyst layers,
the sheet-like unit catalyst layers and the void layers are laminated substantially parallel in a thickness direction of the catalyst layer, and
the sheet-like unit catalyst layers contain at least a noble element.

2. The catalyst layer according to claim 1, wherein:
the sheet-like unit catalyst layer includes at least three layers laminated in a thickness direction of the sheet-like unit catalyst layer; and
outermost layers of the laminated structure include at least a noble metal and have a composition different from the composition of an inner layer sandwiched between the outermost layers.

3. The catalyst layer according to claim 2, wherein at least one of the outermost layers has a mean thickness of 0.2 to 5 nm.

4. The catalyst layer according to claim 2, wherein:
the outermost layers have higher atomic contents of noble metals than the inner layers.

5. The catalyst layer according to claim 1, wherein:
a number of continuous pores in the sheet-like unit catalyst layer having a diameter of 1 nm or more is 3 or less (including 0) over a length of 20 nm of the sheet-like unit catalyst layer and from a side to the other side in the thickness direction thereof.

6. A membrane electrode assembly, comprising a catalyst layer including a layered structure laminated with sheet-like unit catalyst layers and void layers, each of the sheet-like unit catalyst layers has a mean thickness of 4 to 30 nm, each of the void layers being sandwiched between two of the sheet-like unit catalyst layers, and wherein
the void layer in the structure directly contacts two adjacent sheet-like unit catalyst layers,
the sheet-like unit catalyst layers and the void layers are laminated substantially parallel in a thickness direction of the catalyst layer, and
the sheet-like unit catalyst layers contain at least a noble element.

7. An electrochemical cell, comprising the membrane electrode assembly according to claim 6.

8. A catalyst layer comprising a layered structure, which is laminated with sheet-like unit catalyst layers and void layers, each of the sheet-like unit catalyst layers has a mean thickness of 4 to 30 nm, each of the void layers being sandwiched between two of the sheet-like unit catalyst layers, and wherein the void layer in the structure directly contacts two adjacent sheet-like unit catalyst layers in a cross section, the sheet-like unit catalyst layers and the void layers are laminated substantially parallel in a thickness direction of the catalyst layer, and the sheet-like unit catalyst layers contain at least a noble element.

9. The catalyst layer according to claim 8, wherein:

the sheet-like unit catalyst layer includes at least three layers laminated in a thickness direction of the sheet-like unit catalyst layer; and outermost layers of the laminated structure include at least a noble metal and have a composition different from the composition of an inner layer sandwiched between the outermost layers.

10. The catalyst layer according to claim 9, wherein at least one of the outermost layers has a mean thickness of 0.2 to 5 nm.

11. The catalyst layer according to claim 9, wherein:

the outermost layers have higher atomic contents of noble metals than the inner layers.

12. The catalyst layer according to claim 8, wherein:

a number of continuous pores in the sheet-like unit catalyst layer having a diameter of 1 nm or more is 3 or less (including 0) over a length of 20 nm of the sheet-like unit catalyst layer and from a side to the other side in the thickness direction thereof.

13. A catalyst layer comprising a layered structure, which is laminated with sheet-like unit catalyst layers and void layers, each of the sheet-like unit catalyst layers has a mean thickness of 4 to 30 nm, each of the void layers being sandwiched between two of the sheet-like unit catalyst layers, and wherein the sheet-like unit catalyst layers sandwiching the adjacent void layer are connected with each other, the sheet-like unit catalyst layers and the void layers are laminated substantially parallel in a thickness direction of the catalyst layer, and the sheet-like unit catalyst layers contain at least a noble element.

14. The catalyst layer according to claim 13, wherein:

the sheet-like unit catalyst layer includes at least three layers laminated in a thickness direction of the sheet-like unit catalyst layer; and outermost layers of the laminated structure include at least a noble metal and have a composition different from the composition of an inner layer sandwiched between the outermost layers.

15. The catalyst layer according to claim 14, wherein at least one of the outermost layers has a mean thickness of 0.2 to 5 nm.

16. The catalyst layer according to claim 14, wherein:

the outermost layers have higher atomic contents of noble metals than the inner layers.

17. The catalyst layer according to claim 13, wherein:

a number of continuous pores in the sheet-like unit catalyst layer having a diameter of 1 nm or more is 3 or less (including 0) over a length of 20 nm of the sheet-like unit catalyst layer and from a side to the other side in the thickness direction thereof.

18. A catalyst layer comprising a layered structure, which is laminated with sheet-like unit catalyst layers and void layers, each of the sheet-like unit catalyst layers has a mean thickness of 4 to 30 nm, each of the void layers being sandwiched between two of the sheet-like unit catalyst layers, and wherein the void layer in the structure directly contacts two adjacent sheet-like unit catalyst layers, the sheet-like unit catalyst layers and the void layers are laminated and have a portion substantially parallel in a thickness direction of the catalyst layer, and the sheet-like unit catalyst layers contain at least a noble element.

19. The catalyst layer according to claim 18, wherein:

the sheet-like unit catalyst layer includes at least three layers laminated in a thickness direction of the sheet-like unit catalyst layer; and outermost layers of the laminated structure include at least a noble metal and have a composition different from the composition of an inner layer sandwiched between the outermost layers.

20. The catalyst layer according to claim 18, wherein at least one of the outermost layers has a mean thickness of 0.2 to 5 nm.

21. The catalyst layer according to claim 18, wherein:

a number of continuous pores in the sheet-like unit catalyst layer having a diameter of 1 nm or more is 3 or less (including 0) over a length of 20 nm of the sheet-like unit catalyst layer and from a side to the other side in the thickness direction thereof.

22. The catalyst layer according to claim 18, wherein:

the outermost layers have higher atomic contents of noble metals than the inner layers.

\* \* \* \* \*